United States Patent
Reeves et al.

(10) Patent No.: US 9,538,453 B1
(45) Date of Patent: Jan. 3, 2017

(54) DETERMINING A SERVING SYSTEM FOR A MOBILE STATION IN AN AREA SERVED BY MULTIPLE SERVING SYSTEMS

(71) Applicant: Sprint Spectrum L.P., Overland Park, KS (US)

(72) Inventors: Raymond E. Reeves, Oviedo, FL (US); Simon Youngs, Overland Park, KS (US); Mark D. Peden, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 261 days.

(21) Appl. No.: 13/789,938

(22) Filed: Mar. 8, 2013

(51) Int. Cl.
*H04W 36/00* (2009.01)
*H04W 4/00* (2009.01)
*H04W 48/04* (2009.01)

(52) U.S. Cl.
CPC .................................. *H04W 48/04* (2013.01)

(58) Field of Classification Search
CPC ............. H04W 4/00–4/003; H04W 4/02–4/08; H04W 64/00; H04W 64/003; H04W 64/006
See application file for complete search history.

(56) References Cited

U.S. PATENT DOCUMENTS

| | | | | |
|---|---|---|---|---|
| 6,529,735 B1 * | 3/2003 | De Brito | | 455/456.1 |
| 6,907,032 B2 | 6/2005 | Eastman | | |
| 7,603,119 B1 * | 10/2009 | Durig et al. | | 455/432.3 |
| 8,238,906 B1 * | 8/2012 | Oroskar | | H04W 68/02 |
| | | | | 455/432.1 |
| 8,364,142 B1 * | 1/2013 | Berberian | | H04W 48/16 |
| | | | | 370/332 |
| 9,014,703 B1 * | 4/2015 | Edara | | 455/445 |
| 2003/0137991 A1 | 7/2003 | Doshi et al. | | |
| 2005/0113108 A1 | 5/2005 | Kadakia et al. | | |
| 2006/0199581 A1 * | 9/2006 | Uchida | | H04W 48/10 |
| | | | | 455/432.1 |
| 2007/0004405 A1 * | 1/2007 | Buckley | | H04W 48/18 |
| | | | | 455/434 |
| 2007/0076664 A1 | 4/2007 | An et al. | | |
| 2007/0153813 A1 | 7/2007 | Terpstra et al. | | |
| 2007/0191005 A1 * | 8/2007 | Cooper et al. | | 455/434 |
| 2008/0108378 A1 * | 5/2008 | Gessner et al. | | 455/513 |
| 2008/0313543 A1 * | 12/2008 | Altberg et al. | | 715/730 |

(Continued)

OTHER PUBLICATIONS

Koskelainen, P. et al., A SIP-based Conference Control Framework, NOSSDAV'02, May 2002.

(Continued)

*Primary Examiner* — San Htun (57) ABSTRACT

Methods and a corresponding system for conserving inter-MSC trunk capacity when multiple serving systems provide coverage at a particular geographic area. A first determination is made that when a first mobile station and a second mobile station are both at the particular geographic area, the first mobile station and the second mobile station engage in communications with each other. A second determination is made that the first mobile station and the second mobile station are both at the particular geographic area. And responsive to making at least the first and second determinations, the first mobile station is provisioned with preferred roaming list data that causes the first mobile station to be served by a given one of the multiple serving systems that also serves the second mobile station.

10 Claims, 5 Drawing Sheets

(56) References Cited

U.S. PATENT DOCUMENTS

| | | | |
|---|---|---|---|
| 2009/0088152 A1* | 4/2009 | Orlassino | 455/432.1 |
| 2010/0167724 A1* | 7/2010 | Haran | H04W 48/12 |
| | | | 455/432.3 |
| 2011/0250901 A1* | 10/2011 | Grainger | H04W 4/021 |
| | | | 455/456.1 |
| 2012/0232978 A1* | 9/2012 | Steul | H04W 4/001 |
| | | | 705/14.25 |
| 2013/0185368 A1* | 7/2013 | Nordstrom | H04L 51/32 |
| | | | 709/206 |
| 2014/0031028 A1* | 1/2014 | Yamada et al. | 455/419 |

OTHER PUBLICATIONS

OctaGate DNS—Load Balancing DNS Server with Failover, OctaGate DNS Data Center Edition, www.octagate.com/DNS/DataCenter.asp, Feb. 2006.

Crovella, M. and Carter, R., Dynamic Server Selection in the Internet, Boston University, Jun. 1995.

Tariq, M. et al., Mobility Aware Server Selection for Mobile Streaming Multimedia Content Distribution Networks, DoCoMo Communications Laboratories, Inc., 2004.

Schulzrinne, H. and Rosen, B., Emergency Services for Internet Telephony Systems, Network Working Group, Internet-Draft, Feb. 2004.

\* cited by examiner

DETERMINING A SERVING SYSTEM FOR A MOBILE STATION IN AN AREA SERVED BY MULTIPLE SERVING SYSTEMS

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which mobile stations such as cell phones, tablet computers, tracking devices, embedded wireless modules, and other wirelessly equipped communication devices, can operate. In turn, each base station may be coupled with equipment that provides connectivity with one or more transport networks. Such equipment may include a mobile switching center (MSC) or other serving system that is configured to provide connectivity with the public switched telephone network (PSTN) and/or the Internet for instance. With this arrangement, a mobile station operating in coverage of the network may engage in air interface communication with a base station and may thereby communicate via the base station with various remote network entities or with other mobile stations.

An MSC may also be designed to provide connectivity among multiple base stations under the control of the MSC. For example, the MSC may provide connectivity between a first mobile station that is served by a first base station under the control of the MSC and a second mobile station that is served by a second base station that is also under the control of the MSC. In a cellular wireless network that includes multiple MSCs, inter-MSC trunks may provide connectivity between mobile stations that are served by separate MSCs. For instance, to provide connectivity between a first mobile station that is served by a first MSC and a second mobile station that is served by a second MSC, the first MSC or the second MSC may establish a dedicated circuit on an inter-MSC trunk between the first MSC and the second MSC so that the first mobile station and the second mobile station may communicate. As an example, the inter-MSC trunk may be a T1 digital communications link.

In general, a cellular wireless system may operate in accordance with a particular air interface protocol or "radio access technology," with communications from the base stations to mobile stations defining a downlink or forward link and communications from the mobile stations to the base stations defining an uplink or reverse link. Examples of existing air interface protocols include, without limitation, Code Division Multiple Access (CDMA) (e.g., 1×RTT and 1×EV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH. Each protocol may define its own procedures for initiation of calls, handoff between coverage areas, and functions related to air interface communication.

In accordance with the air interface protocol, each coverage area may operate on one or more carrier frequencies and may define a number of air interface channels for carrying information between the base station and served mobile stations. These channels may be defined in various ways, such as through frequency division multiplexing, time division multiplexing, and/or code-division multiplexing for instance.

Furthermore, mobile stations may store a preferred roaming list (PRL), which includes a prioritized list of communication systems that the mobile station may access and/or not access. In a CDMA system for instance, a PRL is a database that assists a mobile station in the acquisition and selection of a serving CDMA network. For a CDMA 1×RTT system, a PRL includes (i) an acquisition table which lists the band and frequencies that the mobile station is to use when searching to acquire a system and (ii) a system table which identifies systems by a system identification code (SID) and network identification code (NID) pair. For a CDMA 1×EV-DO system, a PRL similarly includes an acquisition table and a system table. However, within the system table, 1×EV-DO systems are identified by a subnet ID as opposed to a SID, NID pair. Each CDMA base station broadcasts its SID, NID pair or subnet ID in system overhead messages. Thus, when a mobile station detects and allowed system, the mobile station may connect to the identified system.

OVERVIEW

Disclosed herein is a method and corresponding apparatus or system to help facilitate determining which of multiple serving systems should serve one or more particular mobile stations when multiple serving systems are available to serve mobile stations in a given area. The method may help to avoid using inter-MSC trunk resources to provide connectivity between a first mobile station and a second mobile station in a scenario where it may be possible for both the first mobile station and the second mobile station to be served by base stations under the control of the same MSC. Such a scenario may occur, for instance, at a particular geographic area (e.g., a border area) where base stations under the control of disparate MSCs each provide coverage.

Accordingly, in one respect, disclosed is a method that may be implemented in a wireless communication system that includes multiple serving systems providing coverage at a particular geographic area. The disclosed method may involve making a first determination that when a first mobile station and a second mobile station are both at the particular geographic area, the first mobile station and the second mobile station engage in communications with each other. Further, the method may involve making a second determination that the first mobile station and the second mobile station are both at the particular geographic area. The method may then involve, responsive to making at least the first and second determinations, provisioning the first mobile station with PRL data that causes the first mobile station to be served by a given one of the multiple serving systems that also serves the second mobile station.

In another respect, disclosed is a system in a wireless communication system that includes multiple serving systems all providing coverage at a particular geographic area. The system may include a processor, data storage, and program instructions stored in the data storage that are executable by the processor to carry out functions. The functions may involve: (i) making a first determination that when a first mobile station and a second mobile station are both at the particular geographic area, the first mobile station and the second mobile station engage in communications with each other, (ii) making a second determination that the first mobile station and the second mobile station are both at the particular geographic area, and (iii) responsive to making at least the first and second determinations, provisioning the first mobile station with PRL data that causes the first mobile station to be served by a given one of the multiple serving systems that also serves the second mobile station.

Further, in still another respect, disclosed is a method that may be implemented in a wireless communication system including a first serving system providing wireless coverage at a particular geographic area and a second serving system also providing coverage at the particular geographic area. The disclosed method may involve making a first determination that a first mobile station and a second mobile station engage in communications with each other. Further, the method may involve making a second determination that the first mobile station and the second mobile station are both at the geographic area. Additionally, the method may involve making a third determination that the first mobile station is being served by the first serving system. Also, the method may involve receiving from the second mobile station a request to engage in communication using the second serving system. The method may then involve, responsive to receiving the request and making the first, second, and third determinations, causing the second mobile station to engage in communication using the first serving system rather than the second serving system.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example network arrangement in which the present methods can be implemented. It should be understood, however, that this and other arrangements described herein are provided as examples only, and other arrangements and other elements (e.g., machines, interfaces, functions, orders of functions, etc.) can be used instead and some elements may be omitted altogether. Further, those skilled in the art will appreciate that many of the elements described herein are functional entities that may be implemented as discrete components or in conjunction with other components, in any suitable combination and location, and may be implemented at least in part by one or more computer processors executing program instructions stored in a non-transitory computer readable medium.

Figure 1:
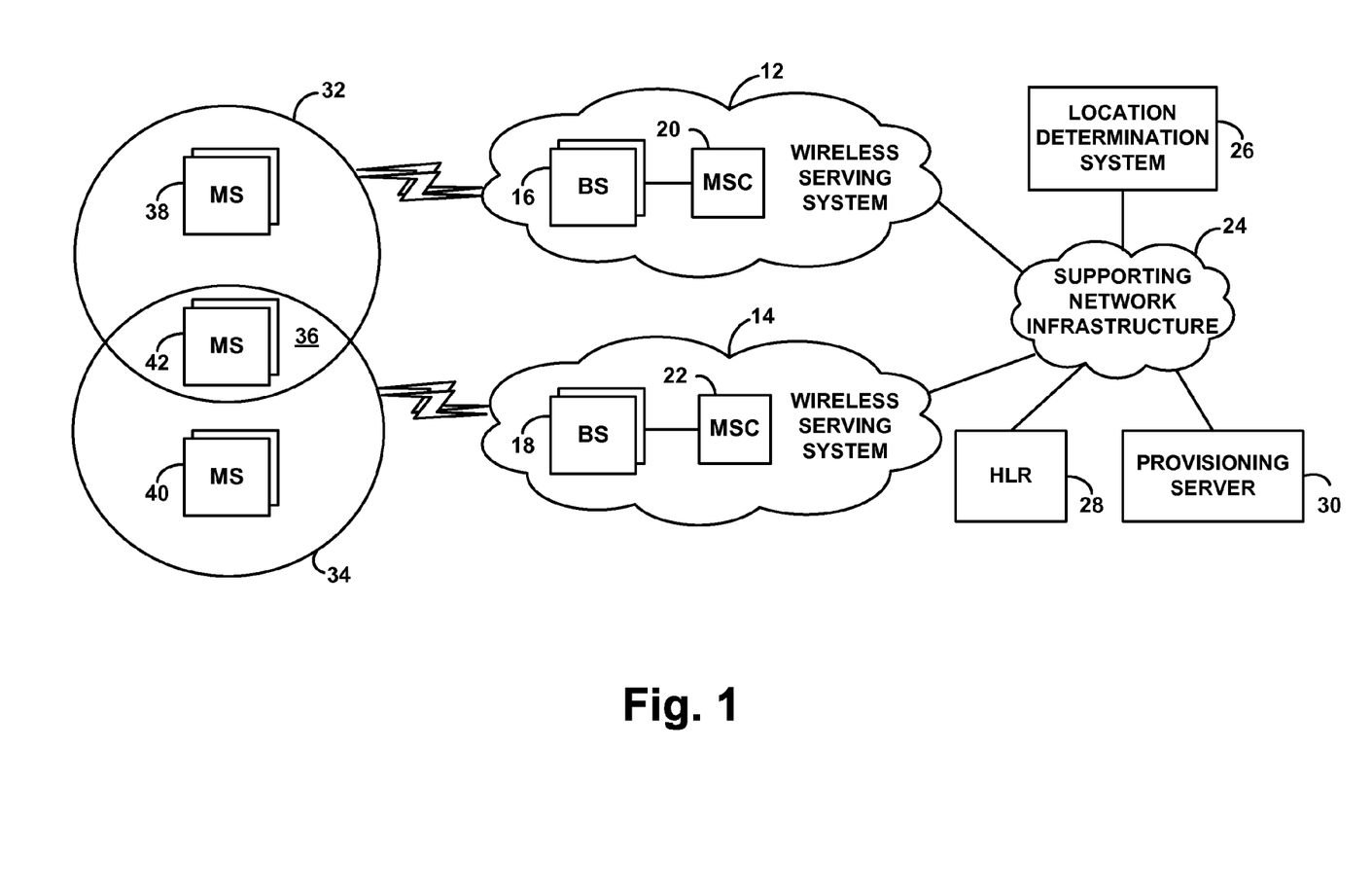
FIG. 1 is a simplified block diagram of a network arrangement in which the present methods can be implemented.

As shown in FIG. 1, the example network arrangement includes two example wireless serving systems 12, 14, each of which may be or include one or more base stations 16, 18 that are arranged to radiate so as to define one or more coverage areas in which mobile stations can operate. In addition, each wireless serving system includes an MSC 20, 22. Each MSC is arranged to provide connectivity among base stations under the control of the MSC. In particular, MSC 20 is arranged to provide connectivity among the one or more base stations 16 and MSC 22 is arranged to provide connectivity among the one or more base stations 18.

As further shown by way of example, each wireless serving system includes or is communicatively linked with supporting network infrastructure 20. Supporting network infrastructure 24 may include various switches, gateways, provisioning servers, accounting servers, policy decision points, and other entities that may be involved with providing or facilitating communication service by the wireless serving systems. For example, each MSC may also be arranged to provide connectivity with one or more transport networks, such as the PSTN or Internet, via supporting network infrastructure 24.

As yet further shown by way of example, supporting network infrastructure 24 includes or is communicatively linked with a location determining system 26 that may help facilitate determining the location of one or more mobile stations served by one or more serving systems. The location determination system, like other entities shown, could take any of a variety of forms and could operate in various ways. By way of example, a representative location determination system may facilitate determining the location of a mobile station based on Global Positioning System (GPS) signaling. In practice, for instance, when the location of a mobile station is requested, the location determination system may signal to the mobile station through supporting network infrastructure and serving system, to obtain from the mobile station information regarding signals that the mobile station received from one or more base stations at known locations. Using that information, the location determination system may triangulate to roughly estimate the mobile station's location and may then provide the mobile station with satellite ephemeris data that enables the mobile station to tune to GPS satellites in the sky over the estimated location. The mobile station may then obtain signals from those satellites and provide the location determination system with information regarding those signals. And the location determination system may then use that information as a basis to determine the mobile station's location with fairly high granularity. The location determination system may then report the determined location to the requesting entity.

As still further shown by way of example, supporting network infrastructure 24 also includes or is communicatively linked with a home location register (HLR) 28, which functions to maintain a home profile record of each subscriber mobile station. In general, for each such mobile station, the HLR may store a subscriber profile record as well as an indication of where in the wireless communication system the mobile station is currently operating, such as which base station, switch, or other node is currently serving the mobile station, to facilitate setup of communications to the mobile station.

In normal practice, when a mobile station powers on or moves into a new coverage area, the mobile station may scan for and detect a pilot signal broadcast by the serving base station and may then transmit a registration message in an access probe to that base station, which may trigger signaling to the HLR to update the mobile station's current location. Further, the mobile station may periodically re-register in a similar manner with a serving system, which may function to confirm or update the record of its location.

Additionally, as shown by way of example, supporting network infrastructure 24 also includes or is communicatively linked with a provisioning server 30, which functions to provide provisioning services. Such a server may provide over the air provisioning services for instance. As an example, such a server may provision a mobile station with service logic and associated parameters by transmitting to a mobile station a trigger message (e.g., a specially encoded SMS message) that causes the mobile station to acquire packet data connectivity and to engage in communication with the server so as to download the service logic and/or associated parameters. In one example, the service logic and associated parameters may be PRL data. Other arrangements are possible as well.

As noted above, the base station(s) 16, 18 of the wireless serving systems radiate to define one or more coverage areas in which mobile stations can operate. Thus, the coverage area of a given wireless serving system may emanate from one or more base stations of that wireless serving system. Further, the coverage area of a given wireless serving system may be made up of multiple contiguous or non-contiguous portions.

In general, the coverage area, or area of coverage, of a given wireless serving system is considered to be the physical area covered by that wireless serving system, such as a particular geographic span of the serving system. For instance, if the base station(s) of a wireless serving system radiate to provide coverage throughout a circular area surrounding a base station, that circular area is considered to be the coverage area of the wireless serving system. Or if the base station(s) of a wireless serving system radiate to provide coverage in some other radiation pattern, that radiation pattern is considered to be the coverage area of the wireless serving system.

FIG. 1 illustrates wireless serving system 12 having a first coverage area 32, and wireless serving system 14 having a second coverage area 34. These coverage areas are shown as being circular areas of similar size. In reality, however, the coverage areas would likely not be circular and would likely be of different sizes. Further, the coverage areas are shown overlapping each other partially in area 36. In practice, however, the coverage areas could overlap each other to a greater extent and could, in one possible scenario, be entirely coterminous.

The base station(s) of the respective wireless serving systems may radiate to define these coverage areas, and may operate, according to any of a variety of air interface protocols now known or later developed. Examples of such protocols include, without limitation, LTE, CDMA (e.g., IS-95, IS-2000, 1xRTT, 1xEV-DO, etc.), WiMAX, TDMA, AMPS, GSM, GPRS, UMTS, and EDGE. Wireless serving system 12 may operate according to the same air interface protocol as wireless serving system 14, or the wireless serving systems may operate according to different air interface protocols. For example, the base station(s) of both wireless serving systems may operate according to LTE. And as another example, the base station(s) of one wireless serving system may operate according to LTE and the base station(s) of the other wireless serving system may operate according to CDMA. Other examples are possible as well.

Each wireless serving system may be arranged to serve one or more mobile stations at a time. Shown operating in coverage area 32 of wireless serving system 12, for instance, are one or more mobile stations 38, and shown operating in coverage area 34 of wireless serving system 14 are then one or more mobile stations 40. These mobile stations may be operating all at once in the illustrated coverage areas or may operate in the illustrated coverage areas at different times. Further one or mobile stations 42 are shown operating in overlap area 36.

These mobile stations can take any of a variety of forms suitable for being served by one or more wireless serving systems and, particularly, being provided with wireless communication service by such system(s). By way of example, mobile stations can be cellular telephones, wirelessly equipped tablet computers, wirelessly equipped personal computers, wirelessly equipped gaming systems, wirelessly equipped embedded telemetry devices (e.g., machine-to-machine devices), or other wirelessly equipped devices now known or later developed. Notwithstanding their title, these devices need not be movable but are considered to be "mobile" because they can engage in cellular wireless communication at various locations. The mobile stations shown in FIG. 1 can all be the same types of devices or can be various different types of devices.

In practice, wireless serving systems may provide mobile stations with various types of wireless communication service, depending on the capabilities of the serving systems, the supporting network infrastructure, and the mobile stations, among other factors. For example, a wireless serving system may provide a mobile station with circuit-switched voice communication service, enabling the mobile station to engage in communications via the serving system with entities on the Public Switched Telephone Network (PSTN) for instance. As another example, a wireless serving system may provide a mobile station with text messaging service, enabling the mobile station to send and receive text messages to other entities served by the serving system and/or by other serving systems. And as another example, a wireless serving system may provide a mobile station with packet-data communication service, enabling the mobile station to engage in communication via the serving system with entities on a packet-switched network such as the Internet. Such packet-data communication service could include voice service (e.g., voice-over-Internet-Protocol (VoIP) service) and other forms of packet-based real-time media service, as well as non-real-time service such as web browsing, messaging, and the like. Numerous other examples of wireless communication service are known, and still others will be developed.

To facilitate providing wireless communication service, a wireless serving system may wirelessly broadcast a pilot or reference signal that mobile stations can detect as an indication of the presence of the wireless serving system. Such a signal may identify the wireless serving system in some manner, to enable mobile stations to search for and detect particular systems. A mobile station may then be programmed with a prioritized list of systems that could serve the mobile station, such as a PRL data for instance, and the mobile station may scan the airwaves for pilot signals indicating the presence of such systems.

Upon detecting such a signal broadcast by a preferred wireless serving system, a mobile station may engage in air interface communication with the detected system to register with the system. The mobile station may then initiate communications via the system and/or the system may connect communications to the mobile station. For instance, the mobile station may send an air interface communication request to the system, seeking to engage in bearer communication via the system, the system may assign air interface traffic channel resources for the requested communication, and the mobile station may proceed to engage in the communication. Likewise, the system may receive a request to connect a communication to the mobile station, the system may page the mobile station over an air interface, and upon receipt of a response from the mobile station, the system may similarly assign traffic channel resources to enable the mobile station to engage in the communication.

Figure 2:
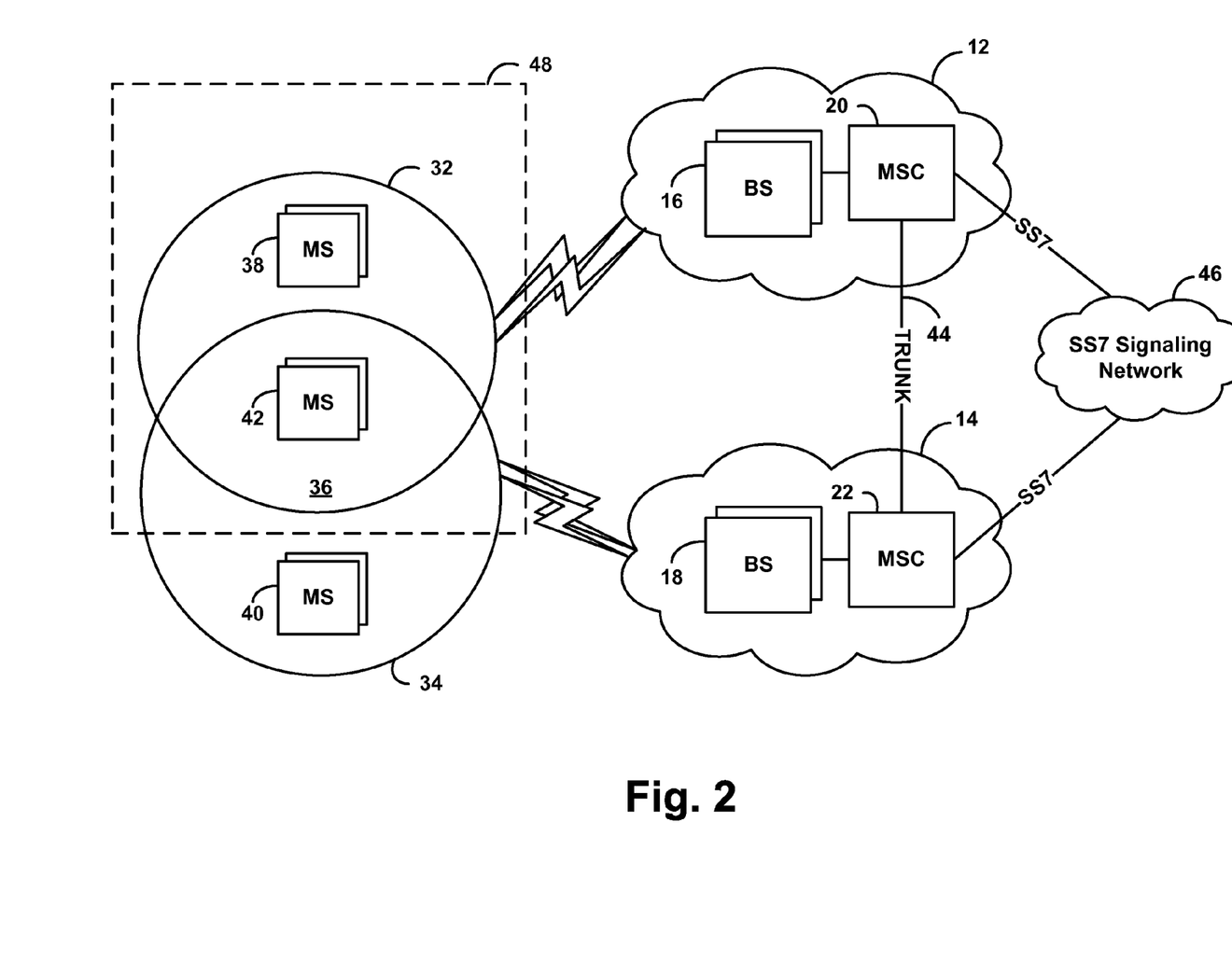
FIG. 2 is simplified block diagram illustrating additional components of the network arrangement of FIG. 1.

In a network arrangement that includes multiple MSCs, inter-MSC trunks may provide connectivity between mobile stations that are served by separate MSCs. FIG. 2 illustrates additional components of the network arrangement of FIG. 1. In particular, FIG. 2 shows, by way of example, an inter-MSC trunk that can provide connectivity between mobile stations that are served by separate wireless serving systems. An inter-MSC trunk may be one or more single transmission channels between a first MSC and a second MSC that can support data and audio transmission as well as supervisory signals. In one instance, a transmission channel may include a T1 digital communications link. However, fiber-optic communication links, microwave communication links, or other types of communication links may also be used as part of inter-MSC trunks.

In an example scenario, a first mobile station of the one or more mobile stations 36 may desire to engage in communications with a second mobile station of the one or more mobile stations 38. To engage in the desired communications, the first mobile station may send an air interface communication request to the wireless serving system 12. The request may be an origination request message that identifies the second mobile station and any other pertinent information for the desired communication, for example. The wireless serving system 12 may then assign radio resources to the first mobile station. For instance, the MSC 20 may direct one of the base stations 16 to assign an air interface traffic channel over which the first mobile station can communicate.

Additionally, the MSC 20 query the HLR 28 to determine which MSC is currently serving the second mobile station. For example, the MSC 20 may send an IS-41 Location Request (LOCREQ) to the HLR, or an IS-41-D SMS Request (SMSREQ) message to the HLR, providing the HLR with an identifier of the second mobile station, and the HLR would respond (in a Location Request return result (locreq_rr) or SMS Request return result (smsreq_rr)) with the point code of the MSC 22. Upon determining that the MSC 22 is serving the second mobile station, the MSC 20 may engage in signaling to establish a dedicated circuit on an inter-MSC trunk 44 between the MSC 20 and the MSC 22. To establish the dedicated circuit on the inter-MSC trunk 44, the MSC may engage in SS7 Integrated Services Digital Network User Part (ISUP) signaling through SS7 signaling network 46. The SS7 signaling network 46 may include one or more signal transfer points (STPs), remote switching points (SPs), and/or service control points (SCPs) as conventionally well known in the art.

In an example in which the request from the first mobile station is a request to conduct a voice call with the second mobile station, the MSC 20 identifies an available circuit on the inter-MSC trunk 44 and sends an ISUP Initial Address Message (ISUP IAM) to the MSC 22 via the SS7 signaling network 44. The ISUP IAM includes information identifying the circuit (e.g., a circuit identification code (CFC)), the called party, and the type of service (e.g., speech). The MSC 22 in turn assigns radio resources to the second mobile station and sends an ISUP Address Complete Message (ISUP ACM) to the MSC 20 via the SS7 signaling network 46, indicating to the MSC 20 that the second mobile station has been reached. In response to receiving the ISUP ACM message the MSC 20 sends a ringing tone to the first mobile station. When the second mobile station answers, the SS7 signaling network 46 sends an ISUP Answer Message (ISUP ANM) to the MSC 20 to complete setup of the voice call, and the voice call between the first mobile station and the second mobile station commences.

In practice, an inter-MSC trunk may have a limited capacity. For instance, the inter-MSC trunk 44 between the MSC 20 and the MSC 22 may only be arranged to support a certain number of simultaneous voice calls. As noted above, the present methods provide a way to help conserve inter-MSC trunk resources when multiple serving systems are available to serve mobile stations in a particular geographic area. In particular, the present methods provide a way to push two mobile stations to be served by the same MSC if the two mobile stations tend to communicate with each other in the particular geographic area, thereby conserving inter-MSC trunk capacity.

Figure 3:
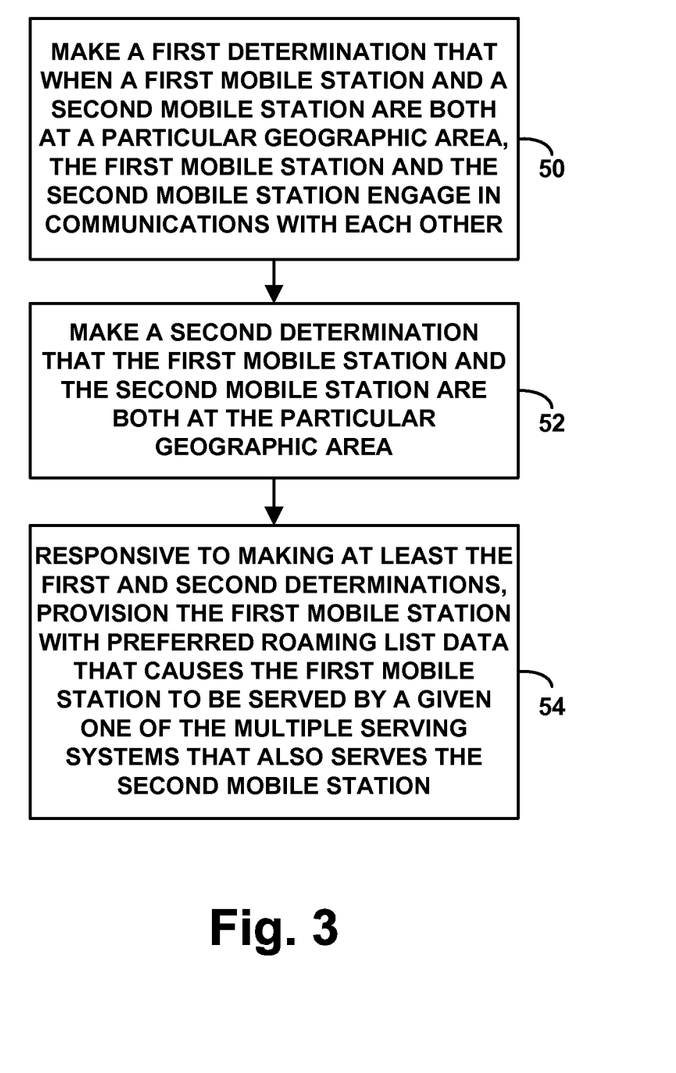
FIG. 3 is a flow chart depicting a set of functions that can be carried out in accordance with a disclosed method.

One example method may be implemented in a wireless communication system that includes multiple serving systems which all provide coverage at a particular geographic area. FIG. 3 is a flow chart depicting more particularly a set of functions that can be carried out in accordance with the example method. This method can be carried out by any of a variety of network entities, alone or in combination, such as any of the entities in the arrangement shown in FIGS. 1 and 2 for instance.

As shown in FIG. 3, at block 50, the method may involve making a first determination that when a first mobile station and a second mobile station are both at a particular geographic area, the first mobile station and the second mobile station engage in communications with each other. In one example, the particular geographic area may be a border area where multiple serving systems provide wireless coverage. For instance, the particular geographic area may be the area 48 of FIG. 2 which includes a portion of coverage areas 32, 34, and 36. In one embodiment, geographic coordinates of the boundary of the area 48 may be stored in a table. Alternatively, the particular geographic area may include any combination of the areas 32, 34, and 36 as is further described below. Various techniques could be applied to determine that the first mobile station and the second mobile station engage in communications with each other when the first mobile station and the second mobile station are both at the particular geographic area.

As one example, a network entity of the wireless communication system may be configured to perform this function by analyzing serving system communication records. The communication records for the first serving system and the second serving system may include a record of calls that were served by the multiple serving systems. Such a record of calls may be maintained by an MSC or other network entity and indicate the date/time of the communication as well as the called and calling parties for instance. If the communication records also provide the geographic locations of the called and calling parties, the server may be configured to filter the communication records to identify communications where the called party and the calling party were both mobile stations located in the particular geographic area. If the communication records do not provide geographic location information, the server may be further configured to poll geographic location records for mobile stations and generate a record of calls that includes location information. For instance, the server may match the geographic location information with the communication records to generate a record of calls that includes location information. Such a generated record of calls may then similarly be filtered to identify communications where the called party and the calling party were both mobile stations located in the particular geographic area.

As another example, a network entity may be configured to make the first determination based on buddy list data for the first mobile station and/or the second mobile station. For instance, if the network identity can determine, based on buddy list data, that two mobile stations are associated with each other, and also determine, based on location records, that each of the two mobile stations has been recently located in the particular geographic area, the network entity may make the determination that the two mobile stations tend to engage in communications with each other when in the particular geographic area. Note that making the first determination may therefore rely on the assumption that (i) if the two mobile stations are associated with each other on one or more buddy lists and (ii) the two mobile stations have been located in the particular geographic area before, than there is a high probability that the two mobile stations tend to engage in communications with each other in the particular geographic area.

In practice, buddy list data for a given mobile station may be stored in a network-based database of subscriber information (or other database) and may identify one or more other mobile stations that are associated with the mobile station. For example, the buddy list of the mobile station may identify other mobile stations that the mobile station engages in communications with using a push-to-talk (PTT) service or an instant messaging (IM) service.

To make the first determination based on buddy list data, a server may be configured to query the location determination system 26 and/or the HLR 28 to determine a list of mobile stations that have been located in the particular geographic area during a previous time period (e.g., the past day, week, month, etc.). The location determination system 26 and/or the HLR 28 may maintain a database that includes information identifying known locations of particular mobile stations over time, and may provide the requested list of mobile stations in response to the query. The server may then retrieve buddy list data for the mobile stations of the list from a database of subscriber information. If the buddy list data for the mobile stations indicates an association between two particular mobile stations of the list of mobile stations (e.g., buddy list data for a first mobile station of the list identifies a second mobile station that is also on the list, or buddy list data for a first mobile station and buddy list data for a second mobile station identify one another), the server may make the first determination.

Continuing with reference to FIG. 3, at block 52, the method may involve making a second determination that the first mobile station and the second mobile station are both at the particular geographic area. In one example, the location determination system 26 of FIG. 1 may be configured to monitor the locations of the first mobile station and the second mobile station. If a server is arranged to carry out this method, the server may query the location determination system 26 regarding the locations of the first mobile station and the second mobile station, and in response to the query, receive the last known location of the first mobile station and the last known location of the second mobile station. The server may then compare the location of the first mobile station and the location of the second mobile station to the location of the particular geographic area. If the server determines that both the location of the first mobile station and the location of the second mobile station are located within the particular geographic area, the server may make the determination that the first mobile station and the second mobile station are both at the particular geographic area.

In another example, a server may be configured to request location information from the first mobile station and the second mobile station. Each of the first mobile station and the second mobile station may be equipped with a positioning system (e.g., a GPS positioning device) that is configured to determine the location of the mobile station. The first mobile station and the second mobile station may then provide the location information to the network entity in response to the request. The server may then compare the location of the first mobile station and the location of the second mobile station to the location of the particular geographic area. If the server determines that both the location of the first mobile station and the location of the second mobile station are located within the particular geographic area, the server may make the determination that the first mobile station and the second mobile station are both at the particular geographic area.

In still another example, the HLR 28 may be configured to store the last known location of the first mobile station and the second mobile station. A server may be configured to query the HLR 28 regarding the locations of the first mobile station and the second mobile station, and in response to the query, receive the last known location of the first mobile station and the last known location of the second mobile station. The server may then compare the location of the first mobile station and the location of the second mobile station to the location of the particular geographic area. If the server determines that both the location of the first mobile station and the location of the second mobile station are located within the particular geographic area, the network entity may make the determination that the first mobile station and the second mobile station are both at the particular geographic area.

As shown at block 54, the method may then involve responsive to making at least the first and second determinations, provisioning the first mobile station with PRL data that causes the first mobile station to be served by a given one of the multiple serving systems that also serves the second mobile station. After making both the first determination and the second determination, a network entity may be configured to provision the first mobile station with the PRL data. In one embodiment, each of the functions at blocks 46, 48, and 50 may be carried out by the same network entity (e.g., provisioning server 30). In another embodiment, the functions at blocks 46, 48, and 50 may be performed by a combination of network entities. For instance, a first server may make the first determination and the second determination and, upon making the first and second determinations, notify a second server (e.g., a provisioning server) that the first server made the first and second determinations. In response to receiving the notification from the first server, the second server may then carry out the function at block 50.

In practice, a provisioning server and/or another network entity may be configured to determine the given serving system and then determine a revised PRL for the first mobile station. The revised PRL may prioritize the given serving system over the other serving systems of the multiple serving systems. For example, the revised PRL may include a revised acquisition table that indicates that the given serving system has a higher priority relative to the other serving systems.

In one example, the given serving system may be the serving system that is currently serving the second mobile station. To determine the serving system that is currently serving the second mobile station, the provisioning server or another network entity may query a HLR. In response to the query, the provisioning server or other network entity may receive an indication from the HLR that the second mobile station is being served by the given serving system.

In another example, the given serving system may be the serving system that serves the second mobile station the most often when the first mobile station and the second mobile station are both at the particular geographic area and engage in communications with each other. To determine the given serving system, the provisioning server or another network entity may query a database of serving system communication records regarding communications between the first mobile station and the second mobile station when the first mobile station and the second mobile station are both at the particular geographic area. In response to the query, the provisioning server or other network entity may receive a list of communications between the first mobile station and the second mobile station. The list of communications may indicate which serving system of the multiple serving systems serves the second mobile station during each of the communications. Based on the list of communications, the provisioning server or other network entity may determine the serving system that serves the second mobile station the most number of times.

In still another example, the given serving system may be the serving system that serves the second mobile station the most often when the second mobile station is at the particular geographic area and engages in communications over the wireless communication system. To determine the given serving system, the provisioning server or another network entity may query a database of serving system communication records regarding communications that the second mobile station has engaged in while at the particular geographic area. In response to the query, the provisioning server or other network entity may receive a list of communications that the second mobile station has engaged in while located at the particular geographic area. Based on the list of communications, the provisioning server or other network entity may determine the serving system that serves the second mobile station the most number of times.

In an embodiment in which a network entity other than the provisioning server determines the given serving system, the network entity may then provide information identifying the given serving system to the provisioning server. In response to determining the given serving system or receiving an indication of the given serving system, the provisioning server may determine PRL data that prioritizes the given serving system over the other serving systems and provide the PRL data to the first mobile station. Determining PRL data that prioritizes the given system may, for instance, involve adding each of the multiple serving systems to an acquisition table and indicating within the acquisition table that the given serving system is preferred over the other serving systems. In one example, the provisioning server may provision the PRL data to the first mobile station using over the air service provisioning (OTASP), for example. However, the provisioning server may also use other existing or future provisioning techniques to provision the first mobile station with the PRL data.

In some examples, the method may further involve making an additional determination that the first mobile station and the second mobile station are being served by separate serving systems of the multiple serving systems. For instance, a network entity may make this determination by querying a HLR to determine which serving systems are serving the first mobile station and the second mobile station. If a response to the query indicates that the first mobile station and the second mobile station are being served by separate serving systems, the network entity may determine that the first mobile station and the second mobile station are being served by separate serving systems. In response to making the determination, the network entity may notify the provisioning server that the first mobile station and the second mobile station are being served by separate serving systems. If the provisioning server also makes the first and second determinations, or receives a notification that another network entity has already made the first and second determinations, the provisioning server may then provision the first mobile station with the PRL data.

In some examples, the method may also involve provisioning the second mobile station with the PRL data in response to making at least the first and second determinations. For instance, if the provisioning server makes both the first and second determinations or receives a notification that both the first and second determinations have been made, the provisioning server may then provision the second mobile station with the PRL data.

Although the method has been described with respect to the particular geographic area being the area 48 of FIG. 2, in another embodiment, the particular geographic area may be the overlap area 36. In still another embodiment, the particular geographic area may be the geographic area encompassing a combination of the area 36 in addition to the area 32 and/or 34. In an example in which the particular geographic area is a combination of the area 32 and the area 36, the first mobile station may be provisioned with PRL data that causes the first mobile station to be served by the serving system 12 rather than the second serving system when the first mobile station is in the area 36. As a result, when the first mobile station is in the area 36 and either the second mobile station is in the area 32 or the second mobile station is in the area 36, the PRL data may cause the first mobile station and the second mobile station to engage in communications using the first serving system 12, thereby conserving inter-MSC trunk capacity.

In an example in which the particular geographic area encompasses both of the area 32 and the area 34, provisioning the first mobile station with PRL data that causes the first mobile station to prefer a particular serving system (e.g. a serving system that serves the second mobile station the most often) may still help to conserve inter-MSC trunk capacity. For instance, if the PRL data causes the first mobile station to engage in communications using the serving system 12 of FIG. 2, inter-MSC trunk capacity may be conserved whenever the first mobile station and the second mobile station are both located within the area formed by the combination of areas 32 and 34. This might not be the case if the first mobile station was otherwise free to engage in communications using either the serving system 12 or serving system 14 when the first mobile station is located in the area 36. Note that even if the PRL data causes the first mobile station to prefer to engage in communications using the serving system 12 rather than the serving system 14, the first mobile station may still engage in communications using the serving system 14 when the first mobile station is in the area 34 because the first mobile station is out of coverage of the serving system 12.

Therefore, in some examples, the first mobile station may be provisioned with PRL data that causes the first mobile station to be served by the same serving system that also serves the second mobile station when the first mobile station and the second mobile station are both at the particular geographic area.

Figure 4:
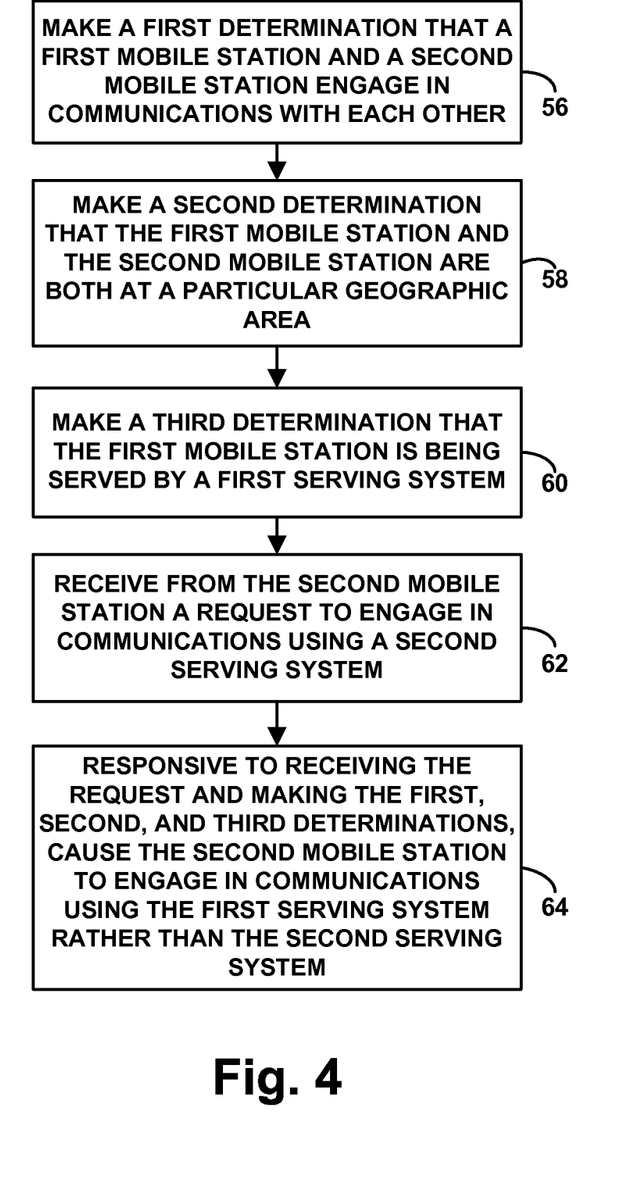
FIG. 4 is a flow chart depicting a set of functions that can be carried out in accordance with another disclosed method.

Another example method may be implemented in a wireless communication system that includes a first serving system and a second serving system that each provide wireless coverage at a particular geographic area. FIG. 4 is a flow chart depicting more particularly a set of functions that can be carried out in accordance with the example method. This method can be carried out by any of a variety of network entities, alone or in combination, such as any of the entities in the arrangement shown in FIGS. 1 and 2 for instance.

As shown in FIG. 4, at block 56, the method may involve making a first determination that a first mobile station and a second mobile station engage in communications with each other. The first determination at block 56 may be made in a similar manner to the first determination at block 50 of FIG. 3. For instance, the first determination may be made based on serving system communication records which indicate that the first mobile station and the station engage in communications with each other (optionally when the first mobile station and the second mobile station are both at a particular geographic area). As another example, the first determination may be made based on buddy list data for one or any combination of the first mobile station and the second mobile station which indicates an association between the first mobile station and the second mobile station.

At block 58, the method may involve making a second determination that the first mobile station and the second mobile station are both at a particular geographic area. The second determination at block 58 may be made in a similar manner to the determination at block 52 of FIG. 3. For instance, a server may be configured to query a location determination system or a HLR to determine the locations of the first mobile station and the second mobile station. The server may then compare the location of the first mobile station and the location of the second mobile station to the location of the particular geographic area. If the server determines that both the location of the first mobile station and the location of the second mobile station are located within the particular geographic area, the server may make the determination that the first mobile station and the second mobile station are both at the particular geographic area.

Continuing with reference to FIG. 4, at block 60, the method may involve making a third determination that the first mobile station is being served by a first serving system. As an example, in practice, this determination may be made by querying a HLR to determine which serving system is serving the first mobile station. However, the determination may similarly be made using other techniques. For example, the first mobile station may store information indicating which serving system is serving the first mobile station and a server or other network entity may query the first mobile station regarding which serving system is serving the first mobile station. If the serving system that is serving the first mobile station is the first serving system, the server or other network entity may determine that the first mobile station is being served by the first serving system.

At block 62, the method may involve receiving from the second mobile station a request to engage in communications using a second serving system. The request may be a request to engage in communications with the first mobile station for instance. Alternatively, the request may be a request to engage in communications with a different party.

As shown in FIG. 4, at block 64, the method may then involve responsive to receiving the request and making the first, second, and third determinations, causing the second mobile station to engage in communications using the first serving system rather than the second serving system. For example, if a network entity has received the request and made the first, second, and third determinations, the network entity may be configured to cause the second mobile station to engage in communications using the first serving system rather than the second serving system.

In one embodiment, each of the functions at blocks 56, 58, 60, 62, and 64 may be carried out by the same network entity. In another embodiment, the functions at one or more of blocks 56, 58, 60, 62, and 64 may be performed by a combination of network entities. For example, if the functions at any of blocks 56, 58, 60, or 62 are carried out by a first server and the function at block 64 is carried out by a second server, the first server may notify the second server when the first, second, and third determinations have been made and the request has been received. The second server may then carry out the function at block 64.

In one example, the function at block 64 may be performed by a serving system that is currently serving the second mobile station. For example, the serving system may stop serving the first mobile station, causing the first mobile station to register and request radio resources from the first serving system to engage in communications.

If the request at block 62 is a request to engage in communications with the first mobile station, causing the second mobile station to engage in communications with the first serving system rather than the second serving system may eliminate the need to use inter-MSC trunk resources for the communication. Alternatively, if the request at block 62 is a request to engage in communications with a different mobile station, causing the second mobile station to engage in communications with the first serving system may still eliminate the need to user inter-MSC trunk resources for a future communication. For example, in the event that the first mobile station contacts the second mobile station or the first mobile station contacts the second mobile station thereafter while the first mobile station and the second mobile station are still being served by the first serving system, inter-MSC trunk resources may not need to be used for the subsequent communication.

In one embodiment, the method may be implemented by the serving system 12 of FIG. 2 and the particular geographic area may be the combination of the area 32 and the area 36 or the particular geographic area may be the area 48. Alternatively, the method may be implemented by any network entity, and the particular geographic area may be the area 36.

Figure 5:
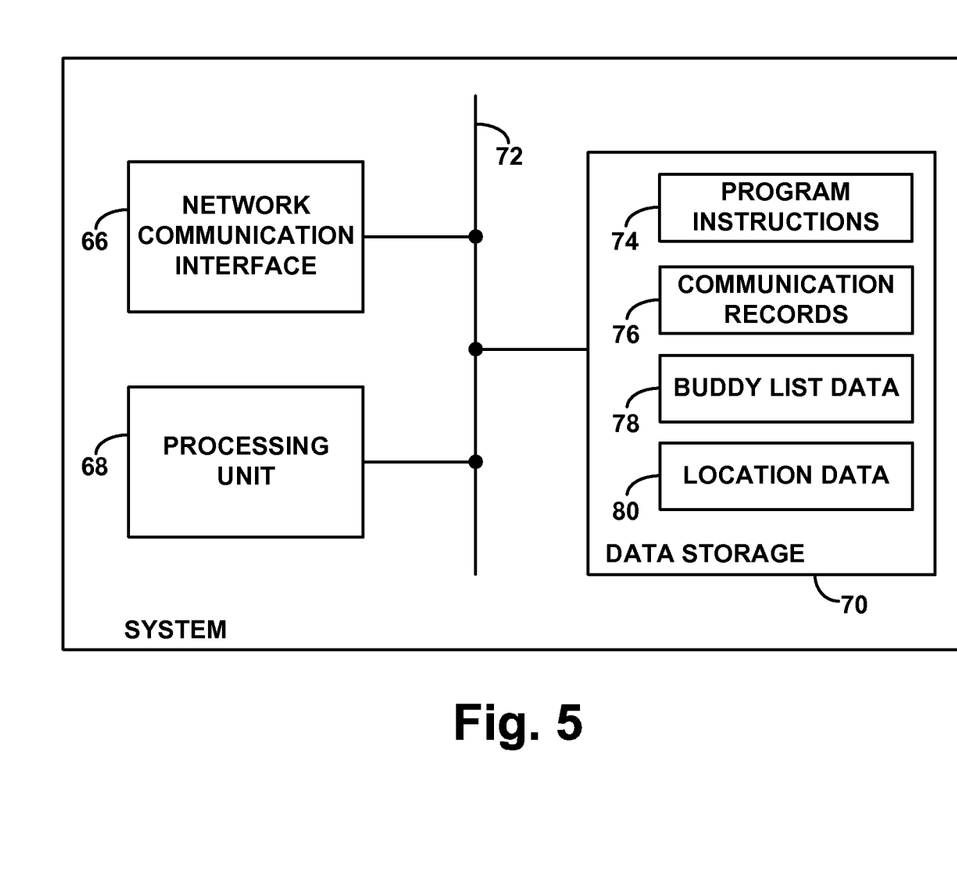
FIG. 5 is a simplified block diagram depicting components of a system that may implement the present methods.

FIG. 5 is next a simplified block diagram depicting components of a representative system that may implement the present methods. As shown, the system includes a network communication interface 62, a processing unit 64, and data storage 66, all of which may be coupled together by a system bus, network, or other communication mechanism 72.

Network communication interface 66 generally functions to facilitate communication on the supporting network infrastructure 24 and may thus include a suitable wireless or wired connection, such as an Ethernet network interface module for instance. Processing unit 68 may comprise one or more general purpose processors and/or one or more special purpose processors. And data storage 70 may include one or more volatile and/or non-volatile storage components and may hold program instructions 74 executable by processing unit 68 to carry out various functions described herein, such as to provision a mobile station with PRL data or cause a mobile station to engage in communications using a particular serving system as discussed above. In some examples, the processing unit 68 may access communication records 76, buddy list data 78, and/or location data 80 that are also stored within the data storage 70.

Exemplary embodiments of the present methods have been described above. Those of ordinary skill in the art will appreciate, however, that changes from the embodiment are possible, while remaining within the scope of the claims.

We claim:

1. In a wireless communication system comprising multiple serving systems all providing coverage at a particular geographic area, wherein each of the multiple serving systems comprises one or more base stations and equipment for providing connectivity with one or more transport networks, a method comprising:
   a processing unit making a first determination, based on a record of past communications between a first mobile station and a second mobile station when the first mobile station and the second mobile station were both at the particular geographic area, that when the first mobile station and the second mobile station are both at the particular geographic area, the first mobile station and the second mobile station tend to engage in communications with each other;
   making a second determination that: (i) the first mobile station and the second mobile station are both at the particular geographic area and (ii) the second mobile station is being served by a particular one of the multiple serving systems; and
   responsive to making at least the first and second determinations, provisioning the first mobile station with preferred roaming list (PRL) data, wherein provisioning the first mobile station with the PRL data causes the first mobile station to be served by the particular serving system when the first mobile station is at the particular geographic area.

2. The method of claim 1, wherein the PRL data prioritizes the particular serving system over all other serving systems of the multiple serving systems.

3. The method of claim 1, wherein determining that the second mobile station is being served by the particular serving system comprises:
   querying a home location register (HLR) about which serving system of the multiple serving systems is serving the second mobile station; and
   receiving an indication from the HLR that the second mobile station is being served by the particular serving system.

4. The method of claim 1, further comprising provisioning the second mobile station with the PRL data in response to making at least the first and second determinations, wherein the PRL data prioritizes the particular serving system over the other serving systems of the multiple serving systems.

5. The method of claim 1, wherein the equipment for providing connectivity with the one or more transport networks comprises a mobile switching center (MSC).

6. The method of claim 1, further comprising:
   making a third determination that the first mobile station is being served by a different serving system of the multiple serving systems than the particular serving system,
   wherein the provisioning the first mobile station with PRL data is responsive to making at least the first, second, and third determinations.

7. In a wireless communication system comprising multiple serving systems all providing coverage at a particular geographic area, wherein each of the multiple serving systems comprises one or more base stations and equipment for providing connectivity with one or more transport networks, a system comprising:
   a processor;
   data storage; and
   program instructions stored in the data storage and executable by the processor to carry out functions comprising:
   (i) making a first determination, based on a record of past communications between a first mobile station and a second mobile station when the first mobile station and the second mobile station were both at the particular geographic area, that when the first mobile station and the second mobile station are both at the particular geographic area, the first mobile station and the second mobile station tend to engage in communications with each other,
   (ii) making a second determination that: (a) the first mobile station and the second mobile station are both at the particular geographic area and (b) of the multiple serving systems, a particular serving system serves the second mobile station the most often when the second mobile station is at the particular geographic area compared to a different serving system of the multiple serving systems serving the second mobile station when the second mobile station is at the particular geographic area, and
   (iii) responsive to making at least the first and second determinations, provisioning the first mobile station with preferred roaming list (PRL) data, wherein provisioning the first mobile station with the PRL data causes the first mobile station to be served by the particular serving system when the first mobile station is at the particular geographic area.

8. The system of claim 7, wherein the processor is a component of one of the multiple serving systems.

9. The system of claim 7, wherein the equipment for providing connectivity with the one or more transport networks comprises a mobile switching center (MSC).

10. The system of claim 7, wherein the functions further comprise provisioning the second mobile station with the PRL data in response to making at least the first and second determinations, wherein the PRL data causes the second mobile station to be served by the particular serving system.

* * * * *